Patented Mar. 4, 1941

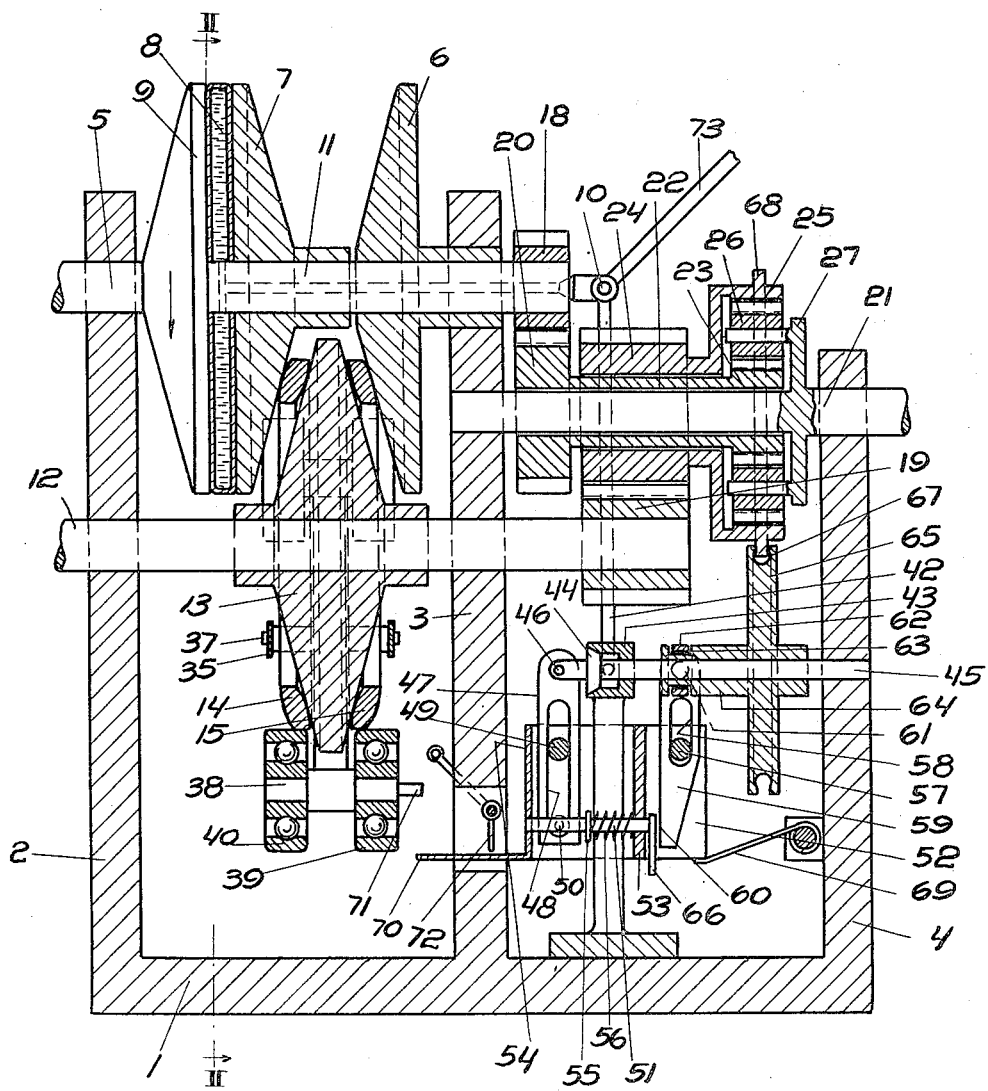

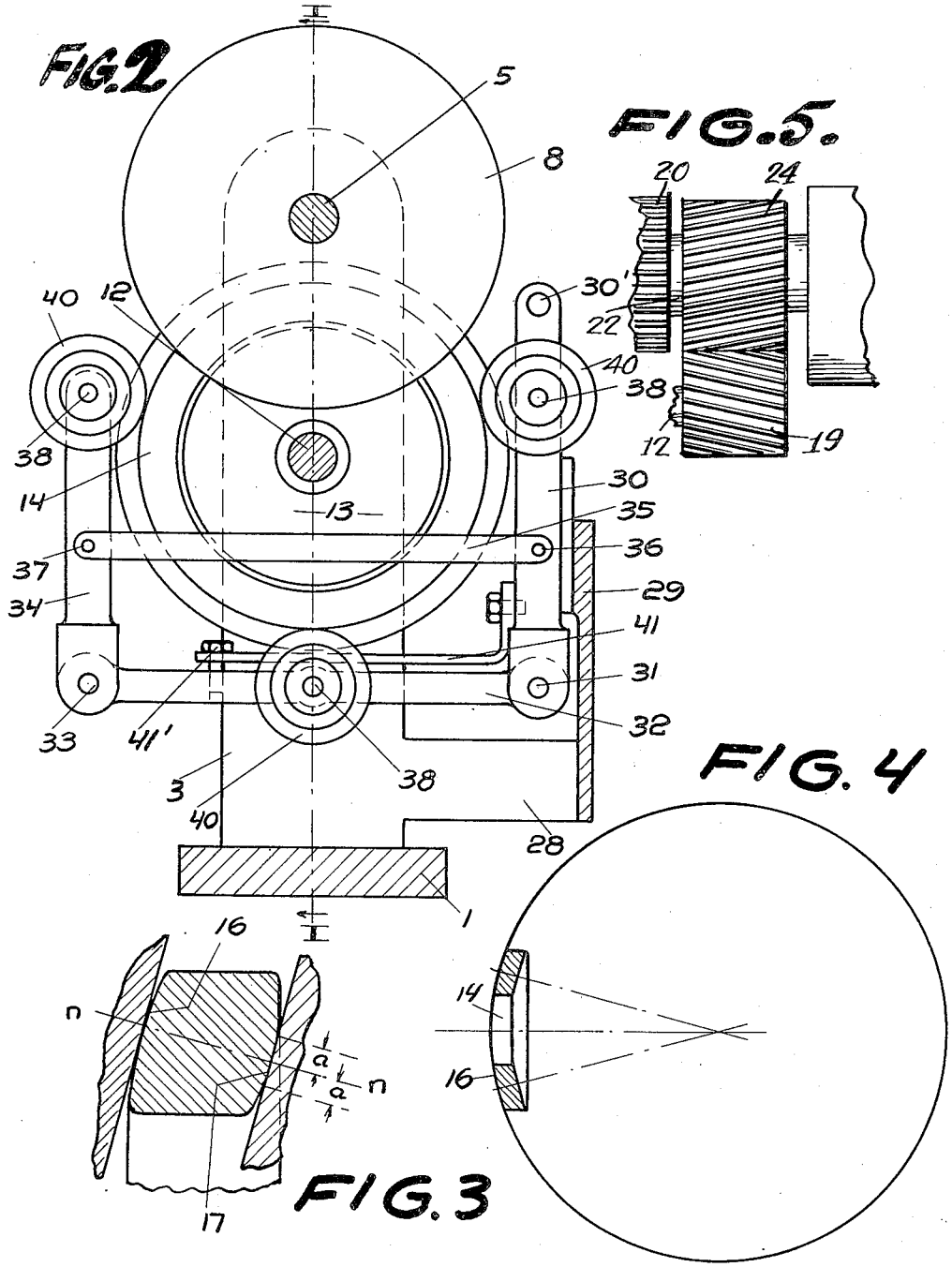

2,233,967

UNITED STATES PATENT OFFICE 2,233,967

CONTINUOUSLY VARIABLE CHANGE SPEED GEAR

Otto Gottfried Wellton, Rasunda, Sweden

Application August 9, 1939, Serial No. 289,310
In Sweden August 10, 1938

15 Claims. (Cl. 74—284)

The invention refers to continuously variable change speed gears of the type involving a resilient, or elastic, engagement between hardened metal surfaces, and preferably combined with a planetary or differential gear.

The invention is characterised in that the resilient, or elastic, gear consists of two driving discs mounted on the same shaft and having convex conical surfaces facing each other, and a driven disc mounted on another shaft in the space between the first mentioned discs and extending therebetween, such last mentioned disc having both of its side faces convex conical of substantially the same conicity as the driving discs, and a rotation transmitting annular member positioned between each of the side faces of the driven disc and the corresponding faces of the driving ones, said annular members being adapted to be radially displaced in relation to the discs for variation of the gear ratio.

In the first place it will be possible by employment of the annular transmission members between the driving discs and the driven one to obtain greater variations in gear ratio at a fixed diameter of the discs. Besides, a greater pressure sustaining strength and thereby an increased duration of the useful length of time will also be obtained.

The invention is illustrated in the accompanying diagrammatical drawings showing a preferable embodiment of the same, and wherein Fig. 1 is a longitudinal section of the change speed gear at the line I—I in Fig. 2, Fig. 2 is a cross section at the line II—II in Fig. 1.

Fig. 3 is a detail of Fig. 1 drawn to a larger scale, and

Fig. 4 is a diagram having for its object to explain the pressure sustaining capacity of the movement transmitting members.

Fig. 5 is a view in elevation showing the inclined teeth of the operative gears.

Referring to the drawings, 1 is a base plate having three upstanding bearing supports 2, 3 and 4. The shaft 5 is the driving one and mounted in suitable bearings in the left hand bearing support 2 and the intermediate support 3 (Fig. 1), and the shaft 5 supports a first driving disc 6 rigidly secured thereto and a second driving disc 7 which is longitudinally slidable on the shaft but non-rotatable in relation to the same. The sides of the said discs facing each other are convex conical and consist of hardened, grinded and polished high grade steel having a high modulus of elasticity. The slidable disc 7 rests against an expansible hollow cushion 8 for instance of leather or copper and filled with a liquid, for instance oil, such cushion resting in its turn against a disc 9 affixed to the shaft 5. The said cushion 8 can be expanded by admission of oil under pressure into the same, and thereby the disc 7 will be displaced towards the disc 6. Oil is admitted to the cushion 8 from a feed pipe 10 which by suitable tightening and rotation permitting coupling means is connected with a central longitudinal bore 11 through the shaft 5 and opening towards the interior of the cushion 8.

A shaft 12 is journalled in the bearing supports 2 and 3 beneath the shaft 5, and a disc 13 extending between the discs 6 and 7 is axially displaceably but non-rotatably mounted on the first mentioned shaft 12. The two opposite side faces of the disc 12 are convex conical of substantially the same conicity as the sides of the discs 6 and 7 facing each other, so that the distance between two adjacent discs measured in a plane through both of the shafts 5 and 12 and at right angles to the disc faces will be the same in all points. The same material is used in the conical faces of the disc 13 as in the corresponding working faces of the discs 6 and 7.

The movement is transmitted from the discs 6 and 7 to the disc 13, or vice versa, by means of hardened, grinded and polished steel rings 14 and 15, one of which is shown in section at a greater scale in Fig. 3. It may be assumed that said rings are cut out from a sphere (Fig. 4), so that the surface of the sphere forms one of the working faces 16 of the ring, whereas the opposite working face 17 of the same constitutes a concave conical surface extending for a distance $a$ at opposite sides of the normal $n$—$n$ to the working face 16 in the contact point between the same and the conical disc 7 (Fig. 3), or of a suitably curved surface, for instance a torus surface. Due to this formation of the ring, as cut out from a sphere, the working surface 16 will get the same pressure resisting strength as the sphere itself in spite of the fact that the ring constitutes a small fraction of the sphere. In case the other working surface 17 is given the shape of a torus of the same curvature as the surface 16, the pressure resisting strength of the former will be equally great. In case it is made conical according to Fig. 3, the said strength will be even greater.

The shaft 5 is provided with a toothed gear 18 affixed thereto, and another toothed gear 19 is affixed to the shaft 12. The wheel 18 is in mesh with a toothed gear 20 which is loosely mounted on a shaft 21 (the driven gear shaft) mounted between the bearing supports 3 and 4, and this last mentioned gear wheel by means of a sleeve 22 being connected with the one sun wheel 23 of a planetary gear. The wheel 19 is in mesh with another toothed gear 24 which is journalled on the sleeve 22 and connected with the other planet wheel 25 of the planetary gear. The planet wheels 26 are mounted between the sun wheels 23 and 25, and are supported by a spider 27 rigidly secured to the shaft 21.

The gear ratio between the shaft 5 and the shaft 21 is varied by radial displacement of the rings 14 and 15. When said rings are nearest to the shaft 5, as shown in Fig. 1, the gear ratio is greatest, and if the rings 14, 15 are displaced outwardly from said shaft, the gear ratio is reduced.

The construction serving for displacement of the rings 14 and 15 is as follows: The base plate 1 serves for supporting a bracket 28 having a vertical guide 29 for a link rod 30. The vertical link rod 30 is at its lower end at 31 hingedly connected with one end of a horizontal link rod 32, the other end of which, at 33, being hingedly connected with another vertical link rod 34. The vertical link rods 30, 34 are also hingedly connected with each other by means of another horizontal link rod 35, the hinge bolts of which have the references 36 and 37, so that a complete parallelogram linkage is formed. A strong and angle bent leaf spring 41 is affixed by means of a screw to the vertical link rod 30, and with an adjusting screw 41' to the horizontal link rod 32, such spring serving normally to keep the several links in the positions shown in the drawing (Fig. 2). Support means for the rings 14 and 15 are provided at the upper ends of the vertical link rods 30, 34 and at the centre portion of the horizontal link rod 32. Each of these supporting means consists preferably of two antifriction bearings, for instance ball bearings 39 and 40, mounted at a distance from each other on a shaft 38, and each of such bearings corresponds to one of the rings, the bearings 40 corresponding to the ring 14 and the bearings 39 to the ring 15, as will be understood from Fig. 1, and the rings are preferably in direct contact with the outer ball races of the bearings. Each of the rings 14, 15 rests upon the bearing on the horizontal link 32 and is steadied in transverse direction by the bearings on the upper ends of the links 30, 34, the bearings being symmetrically spaced around the circumference of the rings.

At its uppermost end, the link 30 is provided with a pin 30' for connection with a handle bar or pedal (not shown), and in case a force by such means is applied to the link 30 in the direction of its length, the parallelogram linkage will apply forces to the rings 14, 15, which are directed in such a manner that the rings will roll in helical paths on the discs 6, 7 either outwardly or inwardly depending on the direction of rotation of said discs.

In gears of this type, in which the power transmission is performed by means of elastic interengagement between steel discs and steel rings, it is necessary to provide means for control of the contact pressure between the coacting hardened surfaces. In order to avoid unnecessary frictional losses, increase of temperature and a too early fatiguing of the material, the contact pressure must be kept as low as possible for the function. On the other hand, the contact pressure must not be too small, as this will cause a damaging of the gear faces due to slipping.

According to the invention, the contact pressure is controlled in the following manner: A branch pipe 42 extends from the feed pipe 10 to a valve housing 43 combined with a conical valve plate 44 affixed to a slidable valve spindle 45, one end of which, at 46, being hingedly connected with one arm of a vertical two-armed lever 47 provided with a slot 48 straddling a pin 49 around which the lever is tiltable. At the other end of the lever 47, the slot therein is engaged by a roll 50 mounted on a horizontal rod 51 which is longitudinally slidable in two brackets 53, 54 extending from a slide 52 supporting the pin 49. A flange 55 is provided on the rod 51, and a helical pressure spring 56 is interposed between said flange and the bracket 53, such spring tending to displace the rod 51 towards the left in Fig. 1 and consequently to tilt the lever 47 in clockwise direction around the pin 49, so that the valve 44 is urged towards its seat.

Another pin 57 is also affixed to the slide 52 and engages a slot 58 in a vertical two-armed lever 59 the lower end of which is provided with an edge 60, whereas the upper end of the lever is hingedly engaged by a pin 61 extending radially from a ring 62, which is rotatably mounted in a circumferential groove 63 provided in the hub portion 64 of a disc 65 loosely mounted on the valve spindle 45. The edge 60 rests against a vertical rod member 66 affixed to the adjacent end of the rod 51. The disc 65 is provided with a circumferential groove 67, which is engaged by an annular flange 68 on the outer sun wheel 25 of the planetary gear referred to in the foregoing. The gear wheels 19 and 24 are provided with teeth inclined in relation to the axes of rotation.

The slide 52 is acted upon by a spring 69 tending to displace it upwardly from the lowermost position shown in the drawing (Fig. 1), in which the pin 57 is in the lower end of the slot 58. The slide 52 is also provided with a horizontally extending portion 70 adapted to be acted upon by the extending end 71 of the shaft 38 to the supporting means 39, 40 for the rings 14, 15, but said extending portion 70 may be locked in its lowermost position, or in any other position, by means of an adjustable arm 72 and against the action of the spring 69.

The manner of action of the construction just described is as follows:

An oil pump (not shown) is in continuous action for pumping oil into the feed pipe 10. A portion of this oil flows permanently through the branch pipe 42 and the open valve 44 back to the oil reservoir, and consequently the oil pressure within the cushion 8 and the contact pressure between the rings 14, 15 and the discs 6, 7, 13 is determined by the pressure acting on the valve 44.

Due to the inclining teeth on the wheels 19, 24 as shown in Figure 5, the outer and axially displaceable sun wheel 25 of the planetary gear will be acted upon by a force directed towards the right in the drawings, and such force will be directly proportional to the torque transmitted to the driven side of the gear, when such torque has a positive value. The said force is also transmitted to the disc 65 combined with the sun wheel 25, and by means of said disc the force is transmitted through the lever 59, the edge 60, the connection rod 51 and the lever 47 to the valve 44, so that the latter is neared towards its seat. Thereby the oil pressure within the cushion 8 and consequently also the contact pressure between the rings 14, 15 and the discs 6, 7, 13 are increased.

The contact pressure required is not only dependent on the outgoing torque, however, but also on the position of the rings 14, 15 in relation to the discs 6, 7.

In case the arm 72 is tilted clockwise for releasing the slide 52, the latter will move upwardly under influence from the spring 69 until the member 70 engages the shaft end 71. If thereafter the rings 14, 15 are moved outwardly on the discs 6, 7 from the position shown, the slide 52 will be pushed down, and thereby the closing pressure on the valve 44 will be gradually decreased in correspondence with the downward movement of the slide, and hence the contact pressure between the gear members will be reduced accordingly the more the rings are displaced outwardly on the discs.

An explanation hereto is the following: At the outward displacement of the rings 14, 15 on the discs 6, 7, the torque transmitted to the outgoing shaft 21 is decreased, and hence the force active for displacement of the disc 65 is also reduced, whereas the pressure of the edge 60 on the member 66 will remain constant since the leverage of the lever 59 will be changed according to the downward movement of the slide 52. The leverage of the lever 47 will be simultaneously changed, however, in that the upper arm is lengthened whereas the lower one remains unchanged, and hereby the closing pressure on the valve 44 is reduced.

The construction described above is of such a kind that the variations of the oil pressure will result in a constant relation between the normal and tangential pressure, respectively, on the rings 14, 15 independently of variations of the outgoing torque, and hereby it will be possible to ensure that the said contact pressure will be the most suitable during all working conditions.

If the torque on the outgoing shaft gets a negative value, for instance when braking by engine compression if the gear is used in a motor car, the direction of the force acting on the disc 65 will be reversed, and this would result in that the pressure of the edge 60 should cease, whereby the oil pressure should sink and cause the gear to slip. The spring 56 is provided for avoiding such a result, said spring always exercising a certain minimum pressure on the valve 44 depending upon the position of the rings 14, 15, and this fact results in that the required contact pressure between the rings 14, 15 and the discs 6, 7, 13 is at hand when braking.

As hinted at in the foregoing, the arm 72 can be adjusted into an arbitrary position, i. e. that it may stop the upward movement of the slide 52 in any desired point. Thereby the control of the pressure in dependence of the ring positions may be interrupted in any desired point, and by such means it is possible to limit the increase of pressure to suitable values.

What I claim and desire to secure by Letters Patent is:

1. In a continuously variable change speed gear of the character described, a first shaft, two discs mounted on said shaft and having convex conical sides facing each other, a second shaft supporting a third disc extending into the space between the conical side faces of the first mentioned discs, said third disc being provided with convex conical side faces at both sides and of substantially the same conicity as that of the two first mentioned discs, an annular member positioned at each side of the said third disc and between the same and the other two discs, means for producing a contact pressure between the discs and the annular members positioned therebetween, and means for radial displacement of the said annular members in relation to the discs, the change speed gear thus formed by the discs and the annular members being, by the intermediary of a planetary or differential gear, return coupled in such a manner that a portion of the secondary torque is added to the primary torque.

2. In a change speed gear according to claim 1, the additional features that one of the two discs mounted on the first shaft is axially displaceable in relation to the other and acted upon by preferably hydraulic means for performing such displacement towards the second mentioned disc, the single disc mounted on the second shaft being axially displaceable but non-rotatable thereon.

3. In a continuously variable change speed gear of the character described, a first shaft rigidly secured to a disc and supporting another disc axially displaceable but non-rotatable thereon, both of said discs having convex conical surfaces at the sides facing each other, an abutment affixed to said shaft adjacent to the axially displaceable disc at the outside thereof, an expansible cushioning means between said abutment and the last mentioned disc, fluid pressure means acting on the expansible cushioning means to displace the axially displaceable disc toward the first mentioned disc, a second shaft supporting a third disc extending into the space between the two discs on the first shaft, said third disc being provided with convex conical surfaces at both sides and of substantially the same conicity as that of the two discs on the first shaft, an annular member positioned at each side of the said third disc and between the same and the other two discs, and means for displacement of the said annular members radially in relation to the discs.

4. In a change speed gear according to claim 3, the additional feature that the gear formed by the discs and the annular members is, by the intermediary of a planetary or differential gear, return coupled in such a manner that a portion of the secondary torque is added to the primary torque.

5. In a continuously variable change speed gear of the character described, a first shaft, two discs mounted on said shaft and having convex conical sides facing each other, a second shaft supporting a third disc extending into the space between the conical side faces of the first mentioned one, said third disc being provided with convex conical faces at both sides and of substantially the same conicity as that of the two first mentioned discs, an annular member positioned at each side of said third disc and between the same and the other two discs, means for providing a contact pressure between the discs and the annular members positioned therebetween, and means for radial displacement of said annular members in relation to the discs, said last mentioned means consisting of rotatable members positioned in contact with the annular members and adapted to be displaced for the radial displacement of said members.

6. In a change speed gear according to claim 5, the additional feature that the rotatable members constituting means for radial displacement of the annular members are mounted on a parallelogram linkage kept in a predetermined configuration by spring means and one of its links being slidably guided.

7. In a continuously variable change speed gear of the character described, a first shaft, two discs mounted on said shaft axially displaceably relatively to each other and having convex conical sides facing each other, a second shaft axially displaceably supporting a third disc extending into the space between the conical surfaces of the first mentioned discs, said third disc being provided with convex conical side faces at both sides and of substantially the same conicity as that of the first mentioned discs, an annular member positioned at each side of the said third disc and between the same and the other two discs, means for providing a contact pressure between the discs and the annular members positioned therebetween, antifriction bearings the outer races of which are positioned in contact with the outer circumferences of said annular members in a substantially equally spaced relation, a parallelogram linkage supporting said antifriction bearings, and means for displacing said parallelogram linkage radially in relation to the discs and the annular members, the change speed gear thus formed by the discs and the annular members being, by the intermediary of a planetary or differential gear, return coupled in such a manner that a portion of the secondary torque is added to the primary torque.

8. In a change speed gear according to claim 7, the additional feature that the means for compelling the contact pressure between the discs and the annular members consists of a cushioning means adapted to be expanded by fluid pressure.

9. In a continuously variable change speed gear of the character described, a first shaft, two discs mounted on said shaft and having convex conical sides facing each other, a second shaft supporting a third disc extending into the space between the conical side faces of the first mentioned discs, said third disc being provided with convex conical side faces at both sides and of substantially the same conicity as that of the two first mentioned discs, an annular member positioned at each side of the said third disc and between the same and the other two discs, means for providing a contact pressure between the discs and the annular members positioned therebetween, and means for radial displacement of said annular members in relation to the discs, the sides of the annular members contacting with the discs on the first shaft forming each part of a sphere, whereas the opposite sides of said members contacting with the single disc on the second shaft have each a concave conical shape.

10. In a change speed gear according to claim 9, the additional feature that the change speed gear formed by the discs and the annular members is, by the intermediary of a planetary or differential gear, return coupled in such a manner that a portion of the secondary torque is added to the primary torque.

11. In a continuously variable change speed gear of the character described, a first shaft, two discs mounted on said shaft axially displaceable relatively to each other, such discs having convex conical sides facing each other, a second shaft axially displaceably supporting a third disc extending into the space between the conical side faces of the first mentioned discs and having convex conical side faces at both sides and of substantially the same conicity as that of the two first mentioned discs, an annular member positioned at each side of said third disc and between the same and the other two discs, means for producing a contact pressure between the discs and the annular members, means for radial displacement of the latter in relation to the discs, and means for automatic control of said contact pressure according to variations in the radial position of the annular members in relation to the discs.

12. In a continuously variable change speed gear of the character described, a first shaft, two discs mounted on said shaft axially displaceably relatively to each other, such discs having convex conical sides facing each other, a second shaft axially displaceably supporting a third disc extending into the space between the conical side faces of the first mentioned discs and having convex conical side faces at both sides and of substantially the same conicity as that of the two first mentioned discs, an annular member positioned at each side of said third disc and between the same and the other two discs, a cushioning means, fluid pressure means for the cushioning means to utilize said cushioning means to provide a variable contact pressure between the discs and the annular members, means for radial displacement of the latter radially in relation to the discs, and means for automatic control of the fluid pressure acting upon the expansible cushion according to variations in the radial position of the annular members in relation to the discs.

13. In a continuously variable change speed gear of the character described, a first shaft, two discs mounted on said shaft axially displaceably relatively to each other, such discs having convex conical sides facing each other, a second shaft axially displaceably supporting a third disc extending into the space between the conical side faces of the first mentioned discs and having convex conical side faces at both sides and of substantially the same conicity as that of the two first mentioned discs, an annular member positioned at each side of the said third disc and between the same and the other two discs, antifriction bearings the outer races of which are positioned in contact with the outer circumferences of said annular members in a substantially equally spaced relation, means for supporting said antifriction bearings and adapted for displacement of the same radially in relation to the discs, a cushioning means expansible by fluid pressure and adapted to act upon one of the discs supported by the first shaft for providing a variable contact pressure between the discs and the annular members, and means for automatic control of the fluid pressure acting upon the expansible cushion according to variations in the radial position of the annular members in relation to the discs.

14. In a continuously variable change speed gear of the character described, a first shaft, two discs mounted on said shaft axially displaceably relatively to each other, such discs having convex conical sides facing each other, a second shaft axially displaceably supporting a third disc extending into the space between the conical side faces of the first mentioned discs and having convex conical side faces at both sides and of substantially the same concity as that of the two first mentioned discs, an annular member positioned at each side of said third disc and between the same and the other two discs, means for radial displacement of the annular members in relation to the discs, a cushioning means expansible by fluid pressure to provide a variable contact pressure between the discs and the annular members in dependence of the value of the fluid pressure admitted thereto, a valve means adapted for control of said fluid pressure, and means for control of said valve means in correspondence with the radial position of the annular members in relation to the discs.

15. In a change speed gear according to claim 14, the additional feature that the gear formed by the discs and the annular members is, by the intermediary of a planetary or differential gear, return coupled in such a manner that a portion of the secondary torque is added to the primary torque.

OTTO GOTTFRIED WELLTON.